United States Patent [19]

Martin et al.

[11] Patent Number: 5,283,048

[45] Date of Patent: Feb. 1, 1994

[54] ENTRAINER/DE-ENTRAINER APPARATUS INCLUDING APPARATUS FOR SIGNIFICANTLY IMPROVING THE EFFICIENCY OF THE DE-ENTRAINER

[75] Inventors: Jack Martin, Brookfield; Ed F. Talbot, Hamden, both of Conn.

[73] Assignee: Safety Railway Service Corporation, Hamden, Conn.

[21] Appl. No.: 878,566

[22] Filed: May 5, 1992

[51] Int. Cl.$^5$ .............................................. B01D 50/00
[52] U.S. Cl. .................................. 422/168; 422/172; 55/235; 55/237; 55/238
[58] Field of Search ............... 422/168, 172, 306; 55/92, 235–238; 261/79.2

[56] References Cited

U.S. PATENT DOCUMENTS

| | | | |
|---|---|---|---|
| Re. 28,616 | 11/1975 | Yankura | 55/92 |
| 2,496,281 | 2/1950 | Fisher | 55/238 |
| 2,560,077 | 7/1951 | Bloomer et al. | 55/237 |
| 2,728,409 | 12/1955 | Smith | 55/237 |
| 3,131,237 | 4/1964 | Collins, Jr. | 55/238 |
| 3,881,895 | 5/1975 | Wattles | 55/92 |
| 3,989,485 | 11/1976 | Kilian | 55/92 |
| 4,047,910 | 9/1977 | Krockta | 55/235 |
| 4,128,406 | 12/1978 | Spevack | 55/237 |

Primary Examiner—Robert J. Warden
Assistant Examiner—Hien Tran
Attorney, Agent, or Firm—Louis Weinstein

[57] ABSTRACT

An apparatus for scrubbing a gas in which a vortical flow of a gas and liquid mixture created by an entrainer is emitted from the entrainer and is introduced into a de-entrainer through a guide/deflector assembly. Particulate is removed from the gas and is picked up by the liquid. The de-entrainer separates the liquid from the gas and delivers the scrubbed gas to an outlet. The guide/deflector assembly guides the vortical liquid/gas flow from the entrainer to the de-entrainer and diverts most of the droplets away from the de-entrainer to significantly reduce the amount of liquid droplets entrained in the gas preparatory to entry into the de-entrainer, significantly reducing the amount of droplets emitted with the scrubbed gas. The vane cages of the entrainer/de-entrainer assemblies are designed so that the height to diameter (H:D) ratio is $$\frac{D}{10} \leq H \leq \frac{D}{4},$$

to increase the operating range.

14 Claims, 7 Drawing Sheets

ENTRAINER/DE-ENTRAINER APPARATUS INCLUDING APPARATUS FOR SIGNIFICANTLY IMPROVING THE EFFICIENCY OF THE DE-ENTRAINER

FIELD OF THE INVENTION

The present invention relates to the field of mass contact between two or more media utilizing entrainer/de-entrainer devices, typically referred to as scrubber apparatus, and more particularly, to a novel means for significantly enhancing the efficiency of the entrainer and de-entrainer and hence the mass contact system.

BACKGROUND OF THE INVENTION

The present invention relates to the field of mass contact between at least two media and which may be used for a number of purposes such as the transfer of material, physical or chemical energy from one media to the next, such as, for example, the scrubbing of particulate from air by contact with water; humidifying a gas such as air by contact with water; distillation of volatile components of a liquid by contact with gas; heating or cooling a gas by contact with a warmer or cooler liquid and chemically reacting components contained in the two media.

There exists a number of other applications in which mass contact between media may be employed and it is contemplated that the present invention applies to all of such applications where mass contact between two or more media is desired.

Although the present invention will be described herein primarily making reference to mass contact between a liquid and a gas, such as water and air, for scrubbing, humidifying and/or cooling the air, it should be understood that the invention is not limited thereto.

The conventional approach to mass contact is to provide a vortical flow of gas in a chamber, suspend particles of liquid in the flow of gas and thereafter separate the liquid from the gas. Particulate carried by the gas can be taken up by the liquid to purify, i.e. "scrub", the gas. In addition, gaseous components soluble in the liquid can likewise be removed from the gas medium and the gas can be cooled by the liquid medium and/or humidified if the liquid is water. The present invention relates to such vortical flow type mass contact devices and more particularly, to mass contact devices employing entrainer/de-entrainer apparatus.

In U.S. Pat. No. 3,566,582, issued Mar. 2, 1971, reissued as RE 28,616 on Nov. 18, 1975 and assigned to the assignee of the present invention, there is described a mass contact device in which vortical gas flow is established by forcing a gas, such as air, through a louvered chamber, typically referred to as an annular vane cage, the vanes or louvers being oriented so that air or other gas entering the chamber in the open region or slots between the louvers has a directional flow imparted thereto, which directional flow has both radially inward and tangential directional vector components. The gas is thus caused to circulate about the interior of the chamber and ultimately exits through an axial opening at one end of the chamber, a vortical gas flow pattern thereby being established.

Liquid, such as water is drawn into the vortical gas flow which picks up the liquid and acts upon the liquid, creating a cloud-like suspension of liquid droplets throughout the vortical flow pattern. The droplets circulate with the gas and are concentrated in an annular zone inward from the louvered chamber.

The droplets are acted upon by the centripetal force of the radially inwardly directed component of gas flow, drawing the droplets inwardly of the vortex and ultimately out through the axial outlet opening of the vane cage and a centrifugal force created by the tangential component of the gas flow as well as the mass of the droplets which tend to cause the droplets to migrate outwardly of the vortex and toward the louvered wall. These effects cause a constant inward and outward migration of droplets within the suspended cloud, the migration being a function of droplet size.

The major influence on large droplets is the centrifugal force which causes large droplets to move outwardly and either strike inwardly moving droplets or the vane cage breaking up the droplets into droplets of smaller size. Droplets of smaller size and mass are principally influenced by the centripetal force vector of the vortical air flow. The droplets making up the cloud within the vane cage constantly change in the manner described wherein the proportion of inward and outward migration is a function of operational parameters which include the feed rate of the gas or air through the system, its pressure drop, the angle of the vanes and the dimension of the louvered chamber.

The scrubber vane cages are designed to provide optimum efficiency at a given air flow rating. The desired pressure drop of an entrainer vane cage and a de-entrainer vane cage for a given air flow rating is determined by the annular area of the vane cage which is a function of height and diameter.

Heretofore the accepted design approach was to make the vane cage substantially square in profile, i.e. the height of the vane cage is substantially equal to the diameter. Although the design approach provides optimum efficiency at the desired air flow rate, the efficiency drops considerably as the air flow rate deviates from the desired flow rate in both a positive (greater flow rate) or negative (smaller flow rate) direction, rendering conventional mass contact systems incapable of providing efficient operation over a broad air flow range.

The air vortex in the entrainment vane cage spirals upwardly through a central guide and exits through slots between the spaced apart vanes of a de-entrainment vane cage which imparts an expanding spiral impetus to the air as it leaves the de-entrainment vane cage and enters into an expansion chamber for ultimate egress from the de-entrainment tank.

The cloud moving from the entrainer to the de-entrainer includes water droplets together with air, the water droplets in the scrubber application carrying the particulate which is desired to be removed from the air.

Both large and small water droplets are transferred from the entrainer to the de-entrainer and reduce the efficiency of the de-entrainer and hence the scrubber by reducing the air passing through the de-entrainer vane cages.

The air leaving the de-entrainer vane cage swirls upwardly and egresses from the top of the de-entrainer tank whereas the water strikes the interior wall of the de-entrainment tank and eventually falls to the bottom of the de-entrainer tank where it is collected for filtration and is returned to the entrainer. The air which has been rid of the undesirable particulate is then safely returned to the atmosphere or to a utilization device for reuse. However, a significant amount of water passes through the outlet of the scrubber with the air which is disadvantageous.

The large amount of liquid introduced into the de-entrainer thus significantly reduces scrubber efficiency.

BRIEF DESCRIPTION OF THE INVENTION

The present invention is characterized by comprising deflector means for significantly enhancing the efficiency of the entrainer and de-entrainer and hence the efficiency of the scrubber by collecting most of the water droplets travelling from the entrainer toward the de-entrainer and deflecting the droplets away from the de-entrainer and downwardly toward a collection region which significantly increases the efficiency of the scrubber by significantly reducing the water exiting from the de-entrainment vane cage which limits the exiting water to nothing more than small wisps to greatly increase the scrubbing capacity as well as the efficiency of the scrubber by diverting about 90% of the water away from the de-entrainer thereby significantly reducing the amount of water leaving the scrubber outlet as compared with conventional apparatus.

The ability of the scrubber to provide efficient operation over a broader operating range of air flow rate is obtained by providing vane cages whose height to diameter ratio is between ¼ and 1/10, i.e. wherein the diameter of the vane cage is four to ten times greater than the height. This design feature substantially doubles the percent of deviation from the given rating before efficiency drops to an undesirable level relative to the optimum efficiency at the desired air flow ratio.

In addition, the vanes are individually adjustable enabling the operating efficiency to be further optimized, whereas conventional vane cages employed fixed vanes.

OBJECTS OF THE INVENTION

It is, therefore, one object of the present invention to provide a mass contact apparatus such as, for example, a scrubber in which scrubbing capacity and efficiency is significantly improved.

Still another object of the present invention is to provide a novel mass contact apparatus such as, for example, a scrubber comprising entrainment and de-entrainment means and further incorporating liquid deflector means for diverting substantially all but fine liquid droplets from the de-entrainment means to significantly increase system capacity and efficiency.

Still another object of the present invention is to provide a mass contact apparatus which provides efficient operation over a broad air flow range through the provision of vane cages having a height to diameter ratio in the range of from ¼ to 1/10.

The above, as well as other objects of the present invention will become apparent when reading the accompanying description and drawings.

BRIEF DESCRIPTION OF THE FIGURES

FIG. 3b shows a plan view of a portion of one of the mounting rings employed in the entrainment assembly of FIG. 3a;

FIG. 3d is a plan view showing the manner in which vanes are mounted to a mounting ring in the entrainment assembly of FIG. 3a;

FIG. 4b is an elevational view of a portion of the de-entrainment assembly of FIG. 4a; and FIG. 4c shows an enlarged detailed view of the de-entrainment assembly of FIG. 4a and incorporation droplet deflectors and is a view looking in the direction of arrows 4c–4e of FIG. 4a.

DETAILED DESCRIPTION OF THE INVENTION

Figure 1:
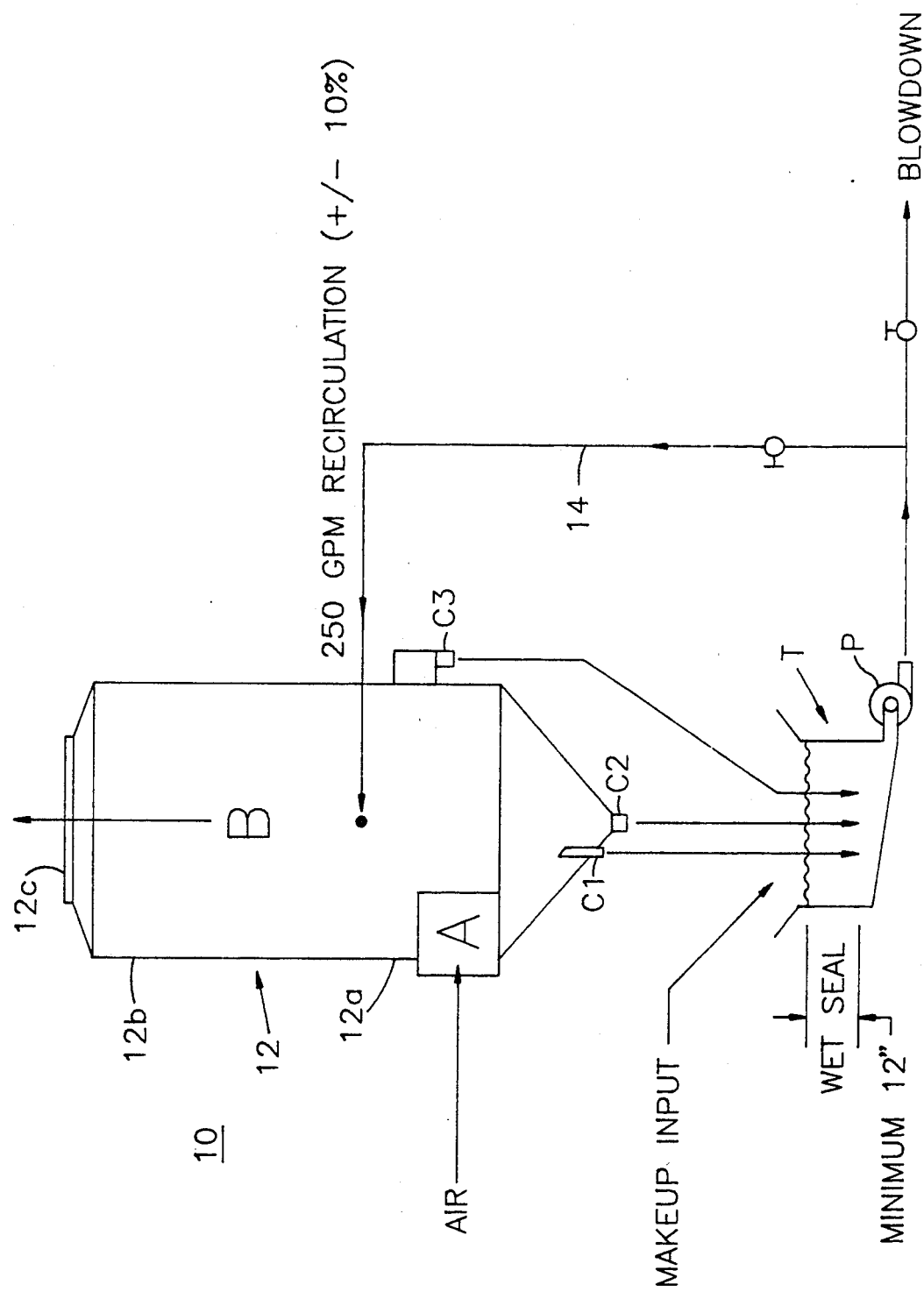
FIG. 1 shows a highly simplified diagram of a scrubber in which the deflection means of the present invention may be used to great advantage.

FIG. 1 shows a mass contact apparatus 10 in which the deflector means of the present invention may be used to great advantage. The mass contact assembly 10 which may, for example, be a scrubber is comprised of a tank 12 having a lower cylindrical portion 12a which houses the entrainment assembly (to be more fully described). Inlet A receives air or another gas which may, for example, be laden with undesirable particulate. The gas is drawn into tank 12 by means of a suitable blower (not shown) typically arranged at the top end of upper cylindrical housing portion 12b, the direction of gas flow being shown by arrow B. Liquid, such as water, is introduced into the entrainment vane cage, to be more fully described, by conduit 14, for example. Liquid delivered to collection tank T from conduits C1, C2 and C3 is returned to scrubber 10 through conduit 14 by pump P, preferably after being filtered (by means not shown). Makeup liquid is introduced into tank T whenever necessary. The liquid may be introduced into the entrainment vane cage 16 in any of the locations shown, for example, in the reissue U.S. Pat. No. RE 28,616.

Figures 2, 2A:
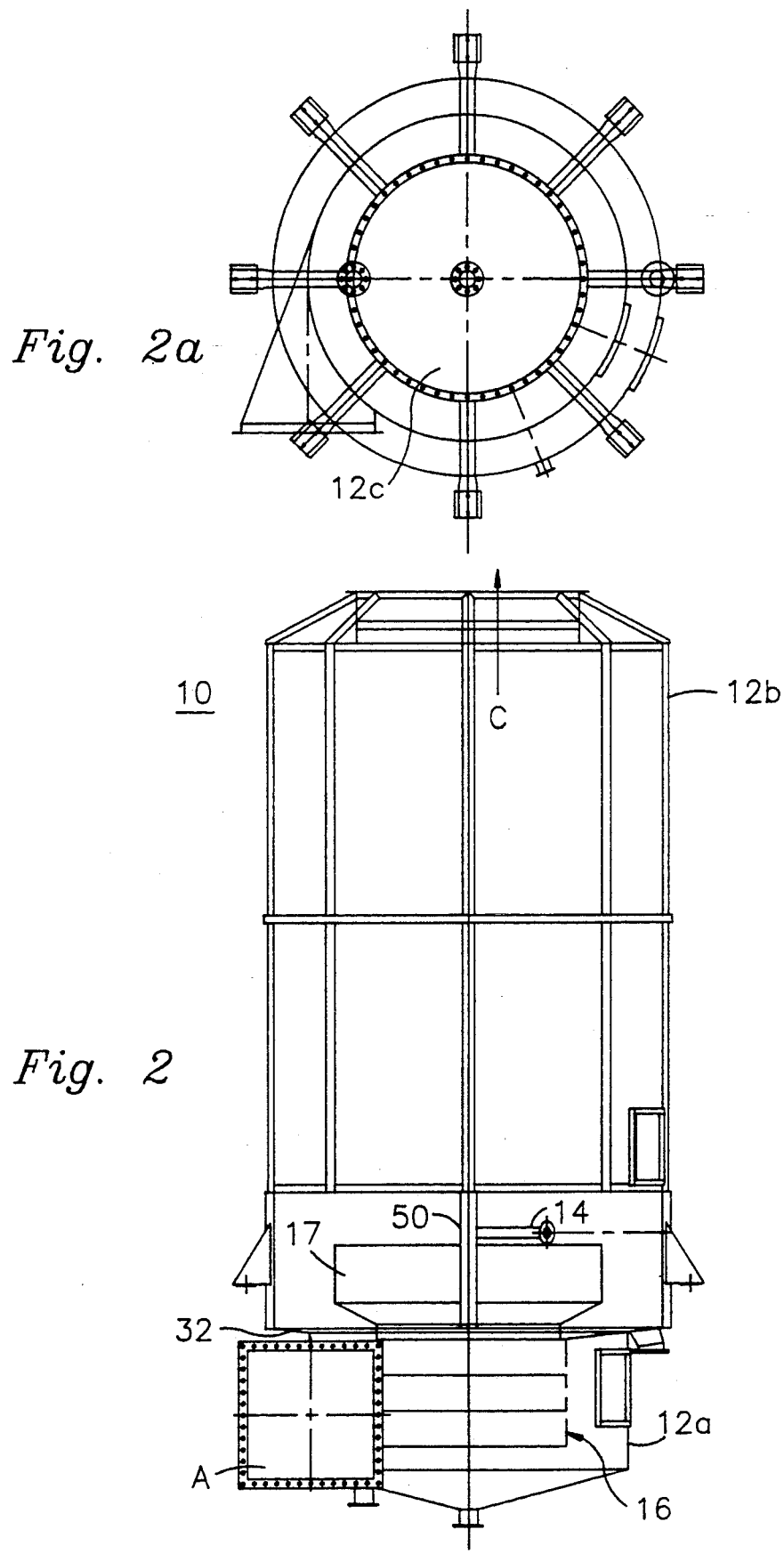
FIG. 2 shows an enlarged detailed elevational view of the apparatus of FIG. 1 showing the location of the entrainment and de-entrainment assemblies.
FIG. 2a shows a top plan view of the arrangement of FIG. 2.

FIG. 2 shows an enlarged detail view of scrubber 10 showing the entrainment vane cage 16 and the de-entrainment vane cage 17.

The entrainment vane cage 16, in one preferred embodiment, is comprised of 66 vanes.

Figure 3A:
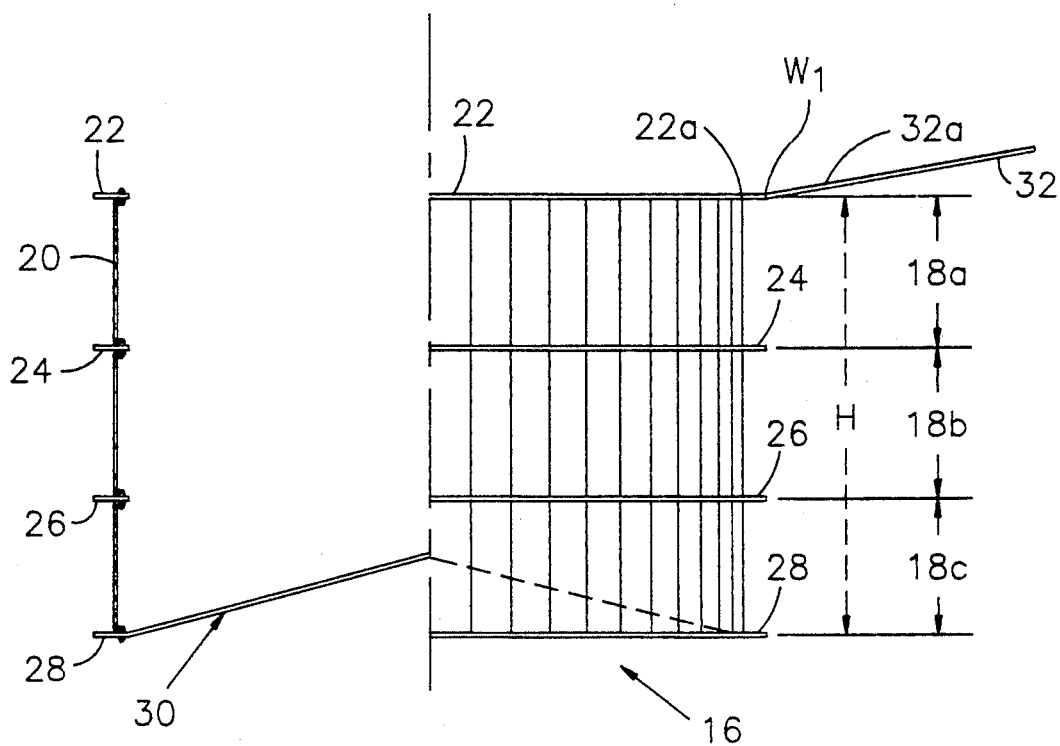
FIG. 3a shows an elevational view, partially sectionalized, of the entrainment assembly of FIG. 2.
Figure 3B:
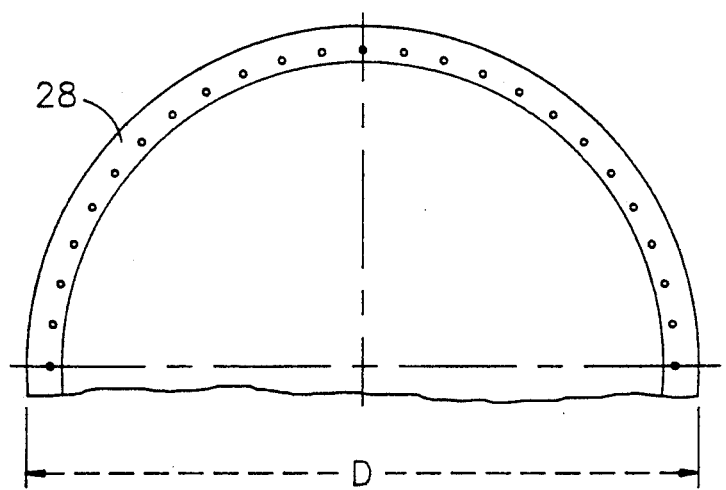
Figure 3C:
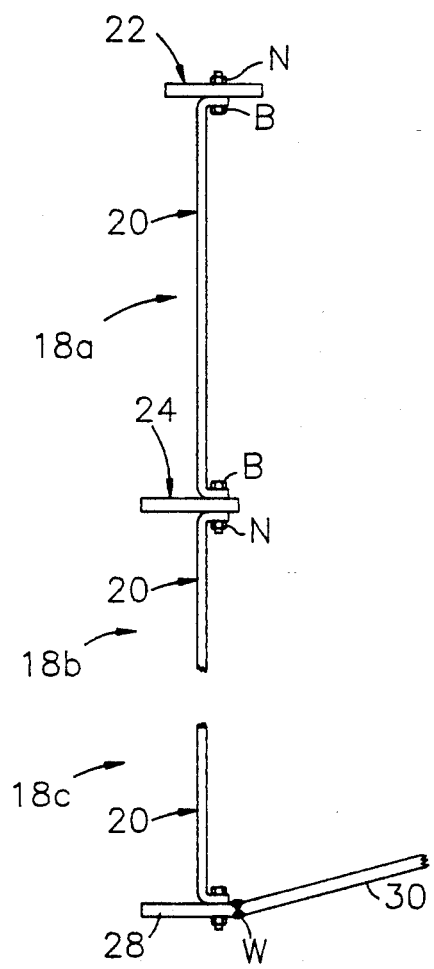
FIG. 3c is a more detailed view of the vanes and mounting rings employed in the entrainment assembly of FIG. 3a, one of the mounting rings and portions of the vanes being omitted for purposes of simplicity.
Figure 3D:
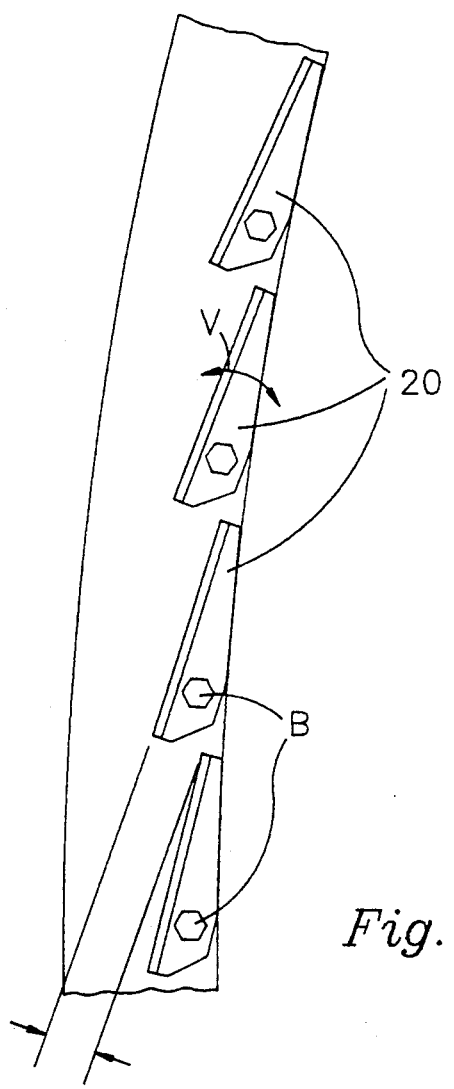

FIG. 3a shows a detailed view of a portion of the entrainment vane cage assembly 16 comprised of three rows or arrays 18a, 18b and 18c of vanes 20 a top view being shown, for example, in FIG. 3d. The top row of vanes 18a are arranged between a top mounting ring 22 and an upper intermediate mounting ring 24. The second row 18b of vanes 20 are arranged between upper intermediate mounting ring 24 and lower intermediate mounting ring 26 while the bottom row 18c of vanes 20 is arranged between lower intermediate mounting ring 26 and bottom mounting ring 28. FIG. 3b shows a plan view of a portion of bottom ring 28. The remaining rings 22, 24, and 26 are similar in design and function.

The top array of vanes 20 are secured between a pair of rings, such as 22 and 24, by threaded bolts B and threaded nuts N which threadedly engage bolts B (see FIG. 3a). FIG. 3c shows the manner in which the vanes of row 18a are secured to mounting rings 22 and 24. Lower intermediate mounting ring 26 and portions of some of the vanes have been omitted from FIG. 3c for purposes of simplicity, it being understood that the lower ends of vanes 20 in middle row 18b and the upper ends of vanes 20 in the lower row 18c are secured to ring 26 in a manner similar to the coupling of the vanes 20 in rows 18a and 18b to upper intermediate mounting ring 24.

The individual vanes are adjustable about their respective mounting bolts as shown by arrows V to assure optimum performance, as shown in FIG. 3d.

The height H of the vane cage 16 relative to the diameter D is selected so that $$\frac{D}{10} \leq H \leq \frac{D}{4}.$$

This relationship enables the scrubber, which is preferably designed for a given air flow rating, to provide efficient operation over an operating range which at the upper and lower ends is approximately twice the percentage deviation from the desired rating of conventional scrubbers using vane cages whose height to diameter relationship is typically $$\frac{H}{D} = \frac{1}{1}.$$

The inlet (or outlet) surface area of the vane cage is selected to obtain the desired pressure drop for a given air flow rating. The configuration of the surface area, i.e. its height and radius of curvature is then selected by using the height to diameter relationship set forth above, with the result that a scrubber using such vane cage design operates efficiently over a substantially greater range of air flow rate than vane cages employing a height to diameter relationship of $$\frac{H}{D} = \frac{1}{1}.$$

For example, the efficiency of the scrubber employing conventional vane cages may drop considerably when the air flow rate deviates about 7% from the designed rate. Employing the design of the present invention, the percent deviation from the desired rate is about double that employing a conventional vane cage.

A cone-shaped member 30 has its outer periphery 30a welded to the inner periphery of bottom ring 28 as shown by weldment W in FIG. 3c, cone 30 extending upwardly into the vane cage 18 in the manner shown best in FIG. 3a. As was mentioned hereinabove, each of the three rows 18a, 18b and 18c contain 66 vanes, the total height of the vane cage being of the order of 38 inches, in one preferred embodiment.

The outer periphery 22a of upper ring 22 is welded to the inner periphery 32a of truncated, conical-shaped contactor roof 32 as shown by the weldment $W_1$.

Figure 4A:
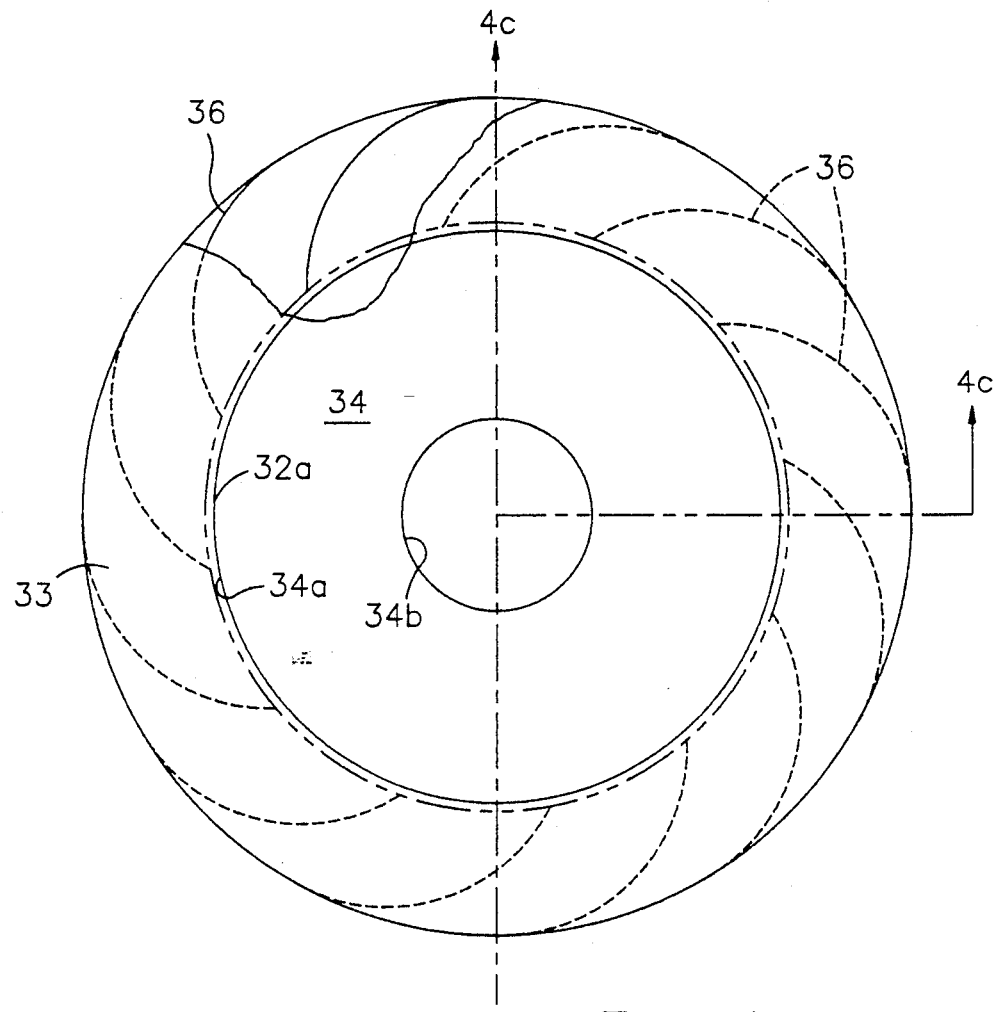
FIG. 4a is a top plan view of the de-entrainment assembly shown in FIG. 2.
Figure 4B:
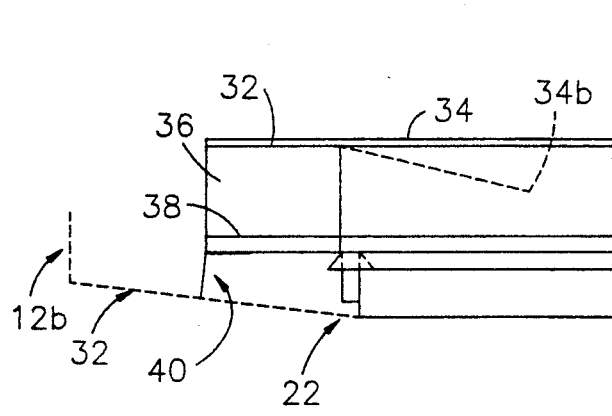
Figure 4C:
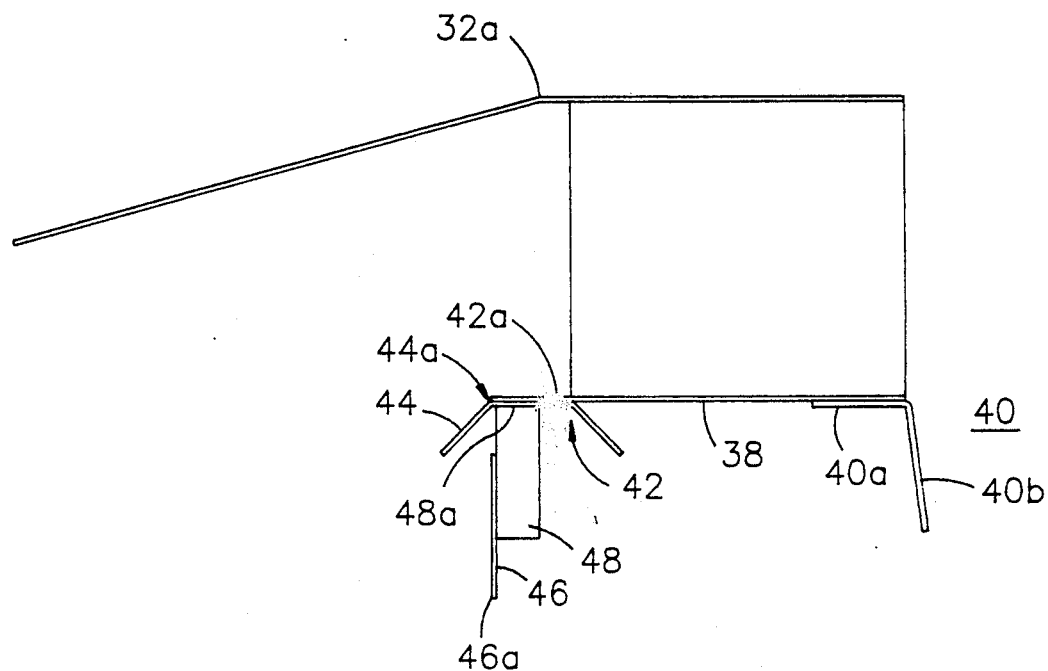

FIGS. 4a, 4b, and 4c respectively show top plan, side elevational and sectional views of the de-entrainer assembly 17 comprised of a top ring 33 whose inner periphery 33a is welded to the outer periphery 34a of an inverted cone-shaped member 34 having a central opening defining inner periphery 34b. A plurality of curved blades 36 are arranged at equi-spaced intervals about the de-entrainment vane cage 17. A ring 38 and ring 33 are arranged in spaced parallel fashion and respectively engage the undersides and topsides of blades 36, the blades being secured to rings 33 and 38. A plurality of substantially L-shaped supporting braces 40, having an arm 40a welded to the underside of ring 38 and a leg 40b, are supported upon the surface of the contactor roof 32 shown in dotted fashion in FIG. 4b and shown also in FIGS. 2 and 3a. The contactor roof 32 extends radially outwardly and joins the portion 12b of cylindrical tank housing 12 shown in dotted fashion in FIG. 4b and shown in solid line fashion in FIG. 2.

A 45 degree truncated cone-shaped ring or deflector ring 42 has its inner diameter end 42a welded to the underside of ring 38. A second 45 degree truncated, cone-shaped ring or deflector ring 44 has its outer periphery 44a welded to the inner periphery of ring 38. A cylindrical guide member 46 has its upper end welded to the lower end of a plurality of metallic segments or tie-bars 48 arranged at equi-spaced intervals about the outer periphery of cylinder 46. In one preferred embodiment, eight such tie-bars are provided spaced, for example, at 45 degree intervals about the outer periphery of cylinder 46. The top surfaces 48a of tie-bars 48 are welded to the underside of ring 38. The bottom end 46a of cylinder 46 is secured to the top surface of the topmost ring 22 of the entrainer vane cage 18 and near the inner periphery of ring 22. Top ring 22 is shown in schematic fashion in FIG. 4b.

The operation of the present invention is as follows:

The blower (or suction device), which has been omitted from the FIGURES for purposes of simplicity, draws air through outlet opening 12c in the tank 12 creating an air flow which draws air inwardly through inlet A shown in FIGS. 1 and 2. The air moves around vane rows 18 and is ultimately drawn into the region surrounded by the vane rows 18. The air passes through the spaces between adjacent vanes which direct the flow of air. Water is introduced through pipe 50 shown in FIG. 2 (which is coupled to line 14 shown in FIGS. 1 and 2) whereby mass contact between the gas (i.e. air) and liquid (i.e. water) occurs both outside of and within the interior of the entrainer assembly vane cage 16. The arrangement of the vanes creates an inward vortical air flow of both the air and the water principally in the region surrounded by vane rows 18.

As was described hereinabove, a constant inward and outward movement of water droplets occurs such that smaller droplets move inwardly due to the greater influence of the vortical air flow while droplets of larger size (and mass) move outwardly toward the periphery of the vane cage due to the principal influence of the centrifugal force. Some droplets leave the vane cage through slots (not shown) provided in the vanes and later return to the vortical flow by passing between adjacent vanes. Large droplets strike other droplets and/or the vane cage and break into smaller droplets. Smaller droplets agglomerate and move outwardly due to the centrifugal force. This inward and outward flow continues throughout the operation of the mass contact assembly assuring the desired intimate mass contact between gas and liquid. The liquid droplets pick up particulate from the vortical flow thus cleaning or "scrubbing" the gas. The vortical flow gas and liquid droplets moves upwardly through the top end of the entrainment assembly 16 and into guide cylinder 46. Most of the liquid droplets are urged against the inner periphery of cylinder 46 and move upwardly as they swirl around where they engage the undersurface of the deflector ring 44, passing out through the gap region between the top edge of cylinder 46 and the bottom surfaces of deflector 44 and ring 38. Deflector ring 42 ultimately deflects the exiting droplets downwardly into a collection pool.

The upward vortical flow of air and finer droplets, which consists primarily of wisps of liquid pass through the opening defined by the inner periphery of ring 44 and ultimately pass outwardly through the de-entrainment vane cage 17. The flow passing through the exiting spaces of the de-entrainment vane cage 17, which is comprised of the open region between adjacent curved vane blades 36, causes an outward vortical flow. The fine wisps of water passing out of the de-entrainment vane cage 17 are urged outwardly and against the inner periphery of the tank 12b due to their mass. The droplets striking the inner periphery of the tank then move downwardly along the interior of tank 12 wherein the water is ultimately collected near the bottom of the tank while the air continues its upward vortical flow and ultimately passes outwardly through opening 12c at the top of the tank to safely enter into the atmosphere or into an output utilization device.

By diverting most of the droplets away from the de-entrainment assembly 17, the larger mass of the droplets and the slower flow rate of the droplets, due to their larger size and mass is diverted away from the de-entrainment cage and hence capacity and the flow rate of the air and fine wisps of water exiting from the vane cage is significantly increased thereby greatly increasing the efficiency and flow capacity of the de-entrainment stage as well as the overall capacity and efficiency of the scrubber. The scrubbed air leaving the scrubber is almost completely dry.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Mass contactor means comprising:
   an enclosure having an inlet for introducing gas into said enclosure;
   entrainment means arranged within said enclosure and having a first array of vane means comprised of vanes arranged spaced apart for deflecting air flowing into said inlet through open spaces between said vanes of said first array of vane means and into a hollow interior region surrounded by said first array of vane means, said first array of vane means creating a vortical flow of gas within said hollow interior region;
   wherein said first array of vane means has an open upper end, an outlet defined by said open upper end enabling said vortical gas flow to move upwardly and out of said first array of vane means;
   de-entrainment means positioned above the open upper end of said entrainment means and being comprised of a second array of vane means comprised of vanes arranged spaced apart for deflecting the vortical gas flow entering into an inlet defined by a bottom open end of said de-entrainment means outwardly through spaces between vanes of said second array of vane means to create an upward, outward circular flow;
   liquid conduit means having an outlet for providing a liquid in at least the hollow interior region of said entrainment means whereby the vortical gas flow draw the liquid into intimate contact therewith and causes the liquid to be accelerated and broken up into a cloud of droplets which approach a velocity of and move in a direction of the vortical gas flow;
   guide means positioned between the outlet of said entrainment means and the inlet of said de-entrainment means to guide the vortical gas flow out of said outlet of said entrainment means and into said inlet of said de-entrainment means;
   wherein an upper end of said guide means is positioned a spaced distance below said inlet of said de-entrainment means to provide a gap region therebetween whereby a vortical cloud of gas and droplets swirl upwardly through said guide means toward the inlet of said de-entrainment means;
   first deflector means arranged between said inlet of said de-entrainment means and the upper end of said guide means and extending radially inward of said guide means, for deflecting larger droplets influenced by a centrifugal force exerted upon the swirling droplets toward said gap region thereby diverting the larger droplets from entry into the de-entrainment means so that predominantly smaller-sized droplets enter said de-entrainment means, resulting in greater efficiency and handling capacity of the mass contactor means and a significant reduction in an amount of droplets exiting the mass contactor means;

second deflector means arranged between said inlet of said de-entrainment means and the upper end of said guide means for deflecting droplets diverted through said gap region by said first deflector means downwardly toward a collection region.

2. The apparatus of claim 1 wherein said first deflector means is arranged to have an outer circumference which is circumscribed by an inner periphery of said guide means and wherein an outer periphery of said guide means is circumscribed by an inner periphery of said second deflector means.

3. The apparatus of claim 2 wherein said guide means comprises a hollow cylindrical member; said first deflector means comprising a truncated cone-shaped member having an inner periphery of a first diameter and an outer periphery of a second diameter greater than said first diameter, said truncated cone-shaped member tapering downwardly and inwardly from said outer periphery of said first deflector means toward said inner periphery of said first deflector means.

4. The apparatus of claim 2 wherein said second deflector means comprises a second truncated cone-shaped member having an inner periphery of a first diameter and an outer periphery of a second diameter greater than said first diameter, said truncated cone-shaped member tapering downwardly and outward from said inner periphery of said second deflector means toward said outer periphery of said second deflector means.

5. The apparatus of claim 1 wherein said entrainment means comprises a plurality of vanes arranged equispaced and defining a circular array;

each of said vanes being independently adjustable about a longitudinal axis to control an angle and a flow rate of the vortical gas flow.

6. The apparatus of claim 5 wherein said vane means of said entrainment means comprises a plurality of arrays of vanes, including a center array, an upper array and a lower array, each having top and bottom ends, said center array being positioned above said lower array and said upper array being arranged above said center array;

a plurality of mounting rings each arranged at top and bottom ends of each of said arrays;

coupling means for securing the top ends of said lower array and the bottom ends of said center array to one of said mounting rings and for securing the top ends of the center array and the bottom ends of said upper array to another one of said mounting rings.

7. The apparatus of claim 6 wherein each of said vanes of said entrainment means comprises a flat intermediate portion and first and second flanges extending from opposite ends of said intermediate portion to form mounting flanges;

each of said mounting flanges being secured to an associated one of said mounting rings by the aforesaid coupling means.

8. The apparatus of claim 1 further comprising:

a plurality of mounting bars being secured at spaced intervals along an upper end of said guide means;

an underside of said de-entrainment means being secured to a top end of each of said mounting bars for displacing said de-entrainment means a spaced distance from said guide means and thereby provide the aforesaid gap region to facilitate removal of droplets of liquid from the upward vortical flow leaving said outlet.

9. The apparatus of claim 1 wherein said second array of vane means comprises a plurality of vanes arranged equi-spaced in a circular array;

each of said vanes being curved about a longitudinal axis to control an angle and a flow rate of the vortical gas flow and create an outward swirling flow from said second array of second vane means.

10. The apparatus of claim 2 wherein the first deflector means inner periphery extends a predetermined distance radially inwardly from the inner periphery of said guide means to limit the amount of droplets deflected thereby.

11. Mass contactor means comprising:

an enclosure having an inlet for introducing gas into said enclosure;

entrainment means arranged within said enclosure having first annular vane cage means for deflecting air flowing into said inlet and through said first vane cage means and into a hollow interior region surrounded by said first vane cage means, said first vane cage means including a plurality of vanes aligned to create an inward vortical flow of gas within said hollow interior region;

wherein said first vane cage means has an outlet defined by an open upper end enabling said vortical flow to move upwardly and out of said first vane cage means;

de-entrainment means having an inlet positioned adjacent to the outlet of said entrainment means and being comprised of second vane cage means having vanes for deflecting the vortical flow entering into an inlet defined by a bottom open end of said de-entrainment means outwardly through open regions between adjacent vanes of said second vane cage means to create an upward, outward circular flow;

means for providing a liquid in at least the hollow interior region of said entrainment means whereby the vortical gas flow draws the liquid into intimate contact therewith and causes the liquid to be accelerated and broken up into a cloud of droplets which approach a velocity of and move in a direction of the vortical gas flow;

wherein a surface defined by the vanes of said first vane cage means is an annular surface area providing a pressure drop for a given air flow rate through said surface area and between the vanes;

wherein H is equal to or greater than $$\frac{D}{10}$$

and is equal to or less than $$\frac{D}{4}$$

H being a height and D being a diameter of said annular surface area.

12. The apparatus of claim 11 wherein said second vane cage means has an annular surface area providing a pressure drop for a given air flow rate through said surface area and between the vanes;

wherein H is equal to or greater than $$\frac{D}{10}$$

and is equal to or less than $$\frac{D}{4}$$

H being a height and D being a diameter of said annular surface area.

13. The apparatus of claim 11 further comprising means for adjustably mounting the vanes of said first vane cage means to adjust a deflecting angle of liquid and gas striking the vanes.

14. The apparatus of claim 13 wherein said second vane cage means further comprises means for adjustably mounting the vanes of said second vane cage means to adjust a deflecting angle of liquid and gas striking the vanes.

* * * * *

UNITED STATES PATENT AND TRADEMARK OFFICE
CERTIFICATE OF CORRECTION

PATENT NO. : 5,283,048
DATED : February 1, 1994
INVENTOR(S) : Martin et al.

It is certified that error appears in the above-indentified patent and that said Letters Patent is hereby corrected as shown below:

Column 4, line 20, change "4c-4e" to --4c-4c--

Column 5, line 8, after "are" insert --rotatably--

Signed and Sealed this

Nineteenth Day of July, 1994

*Attest:*

BRUCE LEHMAN

*Attesting Officer*   *Commissioner of Patents and Trademarks*